(12) United States Patent
Wolf (10) Patent No.: US 7,992,701 B2
(45) Date of Patent: Aug. 9, 2011

(54) CONVEYOR SYSTEM ALIGNER AND METHOD OF ALIGNING

(75) Inventor: Stephen C. Wolf, Grand Rapids, MI (US)

(73) Assignee: Dematic Corp., Grand Rapids, MI (US)

( * ) Notice: Subject to any disclaimer, the term of this patent is extended or adjusted under 35 U.S.C. 154(b) by 213 days.

(21) Appl. No.: 12/211,432

(22) Filed: Sep. 16, 2008

(65) Prior Publication Data

US 2009/0071801 A1 Mar. 19, 2009

Related U.S. Application Data

(60) Provisional application No. 60/973,577, filed on Sep. 19, 2007.

(51) Int. Cl.
*B65G 47/26* (2006.01)

(52) U.S. Cl. .......... 198/457.03; 198/597; 198/836.2

(58) Field of Classification Search ............ 198/457.03, 198/370.1, 458, 597, 836.2
See application file for complete search history.

(56) References Cited

U.S. PATENT DOCUMENTS

| | | | |
|---|---|---|---|
| 3,885,837 A | 5/1975 | Mellor | |
| 3,941,238 A * | 3/1976 | Lapeyre | 198/811 |
| 3,980,174 A | 9/1976 | Conrad | |
| 4,170,281 A * | 10/1979 | Lapeyre | 198/844.2 |
| 4,316,536 A | 2/1982 | Verbeek | |
| 4,356,657 A * | 11/1982 | Goldfarb et al. | 446/236 |
| 4,589,543 A * | 5/1986 | Hastem-Muller | 198/834 |
| 5,833,045 A * | 11/1998 | Osti et al. | 198/444 |
| 5,943,797 A * | 8/1999 | Yoder et al. | 37/359 |
| 5,988,356 A * | 11/1999 | Bonnet | 198/598 |
| 6,302,264 B1 | 10/2001 | Truffaux | |
| 6,321,904 B1 | 11/2001 | Mitchell | |
| 6,564,932 B2 * | 5/2003 | Itoh | 198/835 |
| 6,612,420 B1 * | 9/2003 | Hartness et al. | 198/597 |
| 6,634,487 B2 * | 10/2003 | Ritter et al. | 198/726 |
| 6,834,760 B2 * | 12/2004 | Yamazaki | 198/831 |
| 7,124,876 B2 * | 10/2006 | Wolf | 198/370.08 |
| 7,270,232 B2 * | 9/2007 | Schiltz | 198/835 |
| 7,506,745 B1 * | 3/2009 | McGuire et al. | 198/457.03 |
| 2002/0070097 A1 | 6/2002 | Ritter et al. | |
| 2004/0079622 A1 | 4/2004 | Yamazaki | |
| 2006/0081447 A1 | 4/2006 | Fandella | |

FOREIGN PATENT DOCUMENTS

GB 2211810 A 12/1989
JP 61075713 A 4/1986

* cited by examiner

*Primary Examiner* — Joe Dillon, Jr.
(74) *Attorney, Agent, or Firm* — Van Dyke, Gardner, Linn & Burkhart, LLP (57) ABSTRACT

A conveyor system aligner, method of aligning and continuous aligning belt includes providing a belt support assembly having a generally vertical support surface and a channel defined in the support surface. A belt drive propels the aligning belt along the support surface and items, such as cartons, are conveyed past the aligning belt. A continuous aligning belt is provided that has a contact portion and a guide member. The contact portion has a contact surface and a glide surface. The glide surface is configured to travel along the support surface. The guide member is adapted to be captured by the channel and travels in the channel to support the aligning belt.

18 Claims, 8 Drawing Sheets

CONVEYOR SYSTEM ALIGNER AND
METHOD OF ALIGNING

CROSS REFERENCE TO RELATED
APPLICATION

This application claims priority from U.S. provisional patent application Ser. No. 60/973,577 filed on Sep. 19, 2007, the disclosure of which is hereby incorporated herein by reference in its entirety.

BACKGROUND OF THE INVENTION

The present invention is directed to a conveyor system carton aligner and method of aligning cartons and, in particular, to a technique for aligning articles, such as cartons, into a single file.

Certain known carton aligners have been difficult to maintain and subject to excessive wear. In one such carton aligner, a pair of vertically spaced driven circular belts travel in circular channels with a portion of each belt extending outside the channel to be contacted by cartons in order to align the cartons along the face of the assembly. Each of the belts is reeved by its own system of sheaves and driven by its own belt drive. In order to replace the lower belt, the upper belt must be removed and replaced. Because both belts should travel at close to the same speed, which is related to the speed of the carton conveyor, a complex procedure must be carried out using computer assist to synchronize the two belts with the carton conveyor.

SUMMARY OF THE INVENTION

The present invention is directed to a conveyor system aligner and method of aligning that is easy to maintain and is robust in operation, thereby requiring reduced maintenance.

A conveyor system aligner, method of aligning and continuous aligning belt, according to an aspect of the invention, includes providing a belt support assembly having a generally vertical support surface and a channel defined in the support surface. A belt drive propels the aligning belt along the support surface and articles are conveyed past the aligning belt. A continuous aligning belt is provided that has a contact portion and a guide member. The contact portion has a contact surface and a glide surface. The glide surface is configured to travel along the support surface. The guide member is adapted to be captured by the channel and travels in the channel to support the aligning belt.

At least a portion of the guide member may have a cross section that increases in width away from the contact portion. The channel has an interior surface configuration that engages the guide member. The portion of the guide member may have a V-shaped cross section defining outer surface portions that diverge away from the carton contact portions. In such embodiment, the channel has V-shaped surface portions to engage the outer surface portions of the guide member.

These and other objects, advantages and features of this invention will become apparent upon review of the following specification in conjunction with the drawings.

DESCRIPTION OF THE PREFERRED
EMBODIMENT

Figure 1:
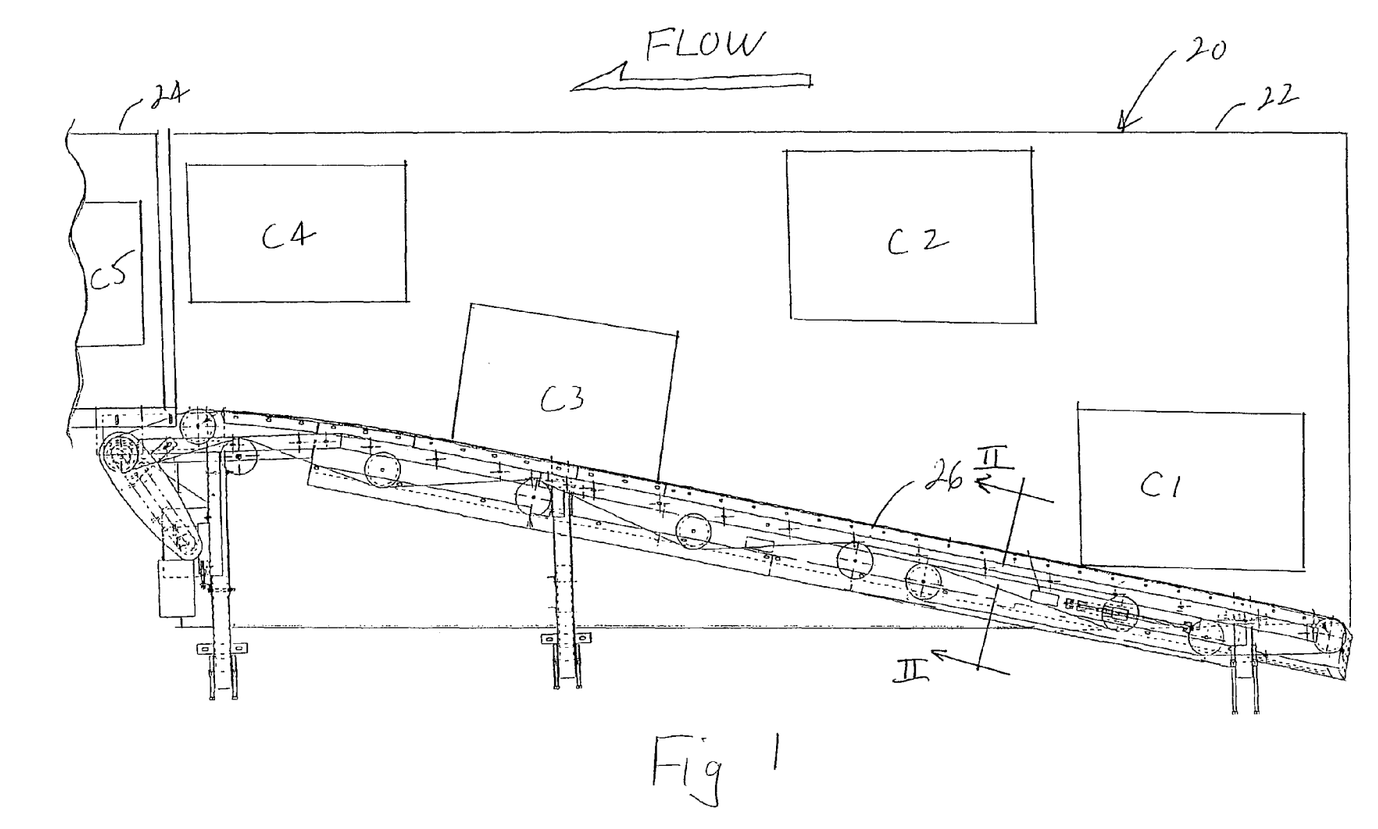
FIG. 1 is directed to a conveyor system having an aligner according to an embodiment of the invention.
Figure 2:
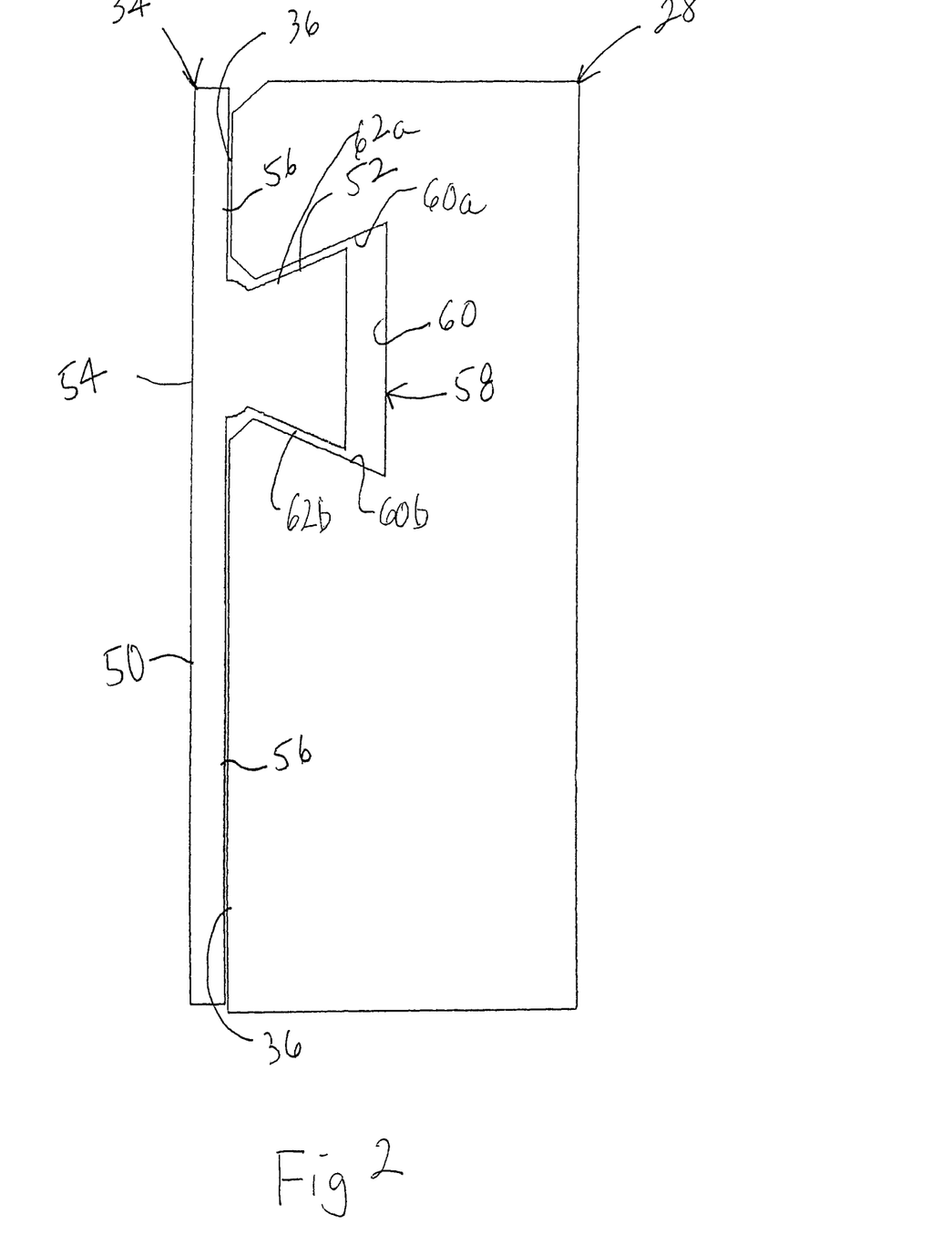
FIG. 2 is a sectional view taken along the lines II-II in FIG. 1.
Figure 3:
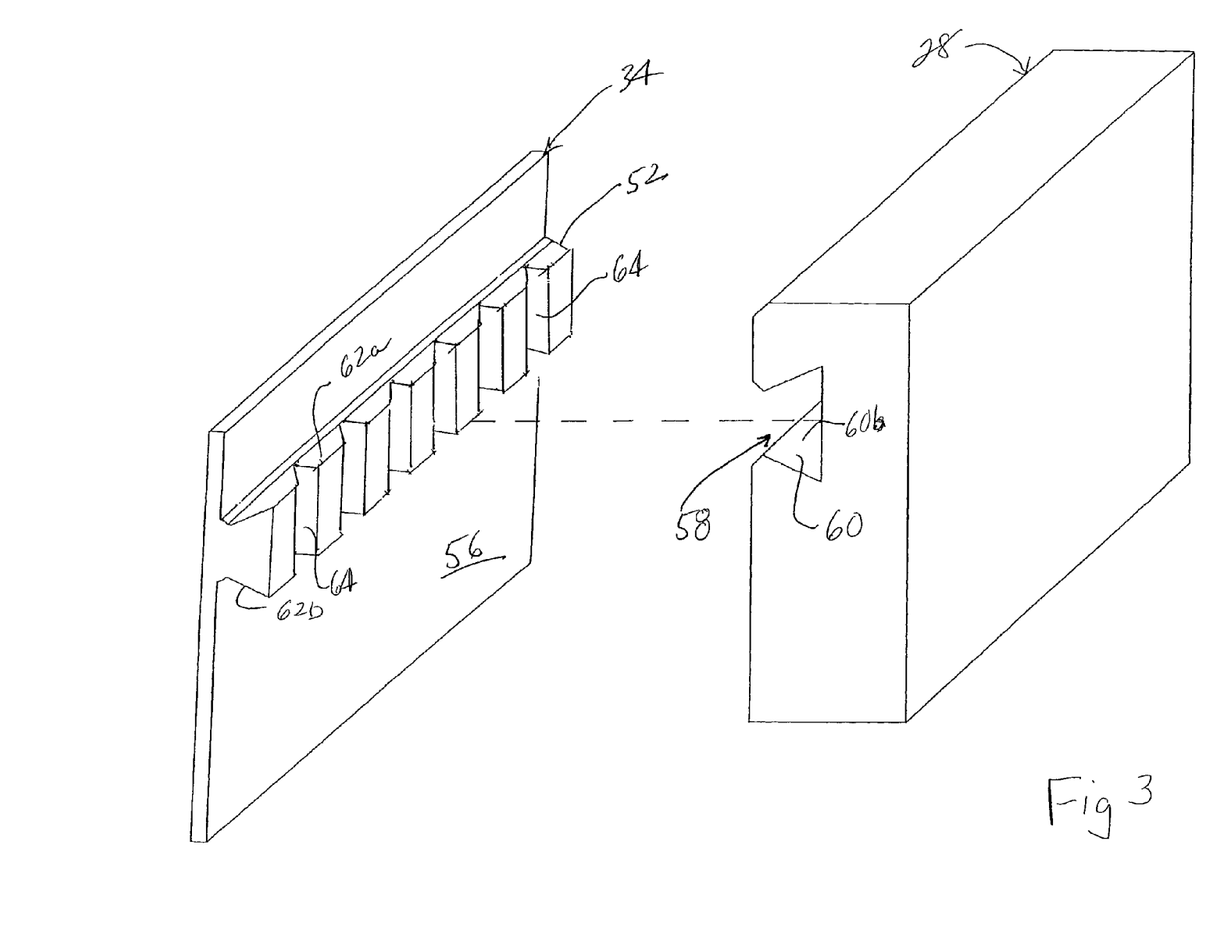
FIG. 3 is an exploded perspective view of the aligning belt and belt support assembly in FIG. 2.
Figure 4A:
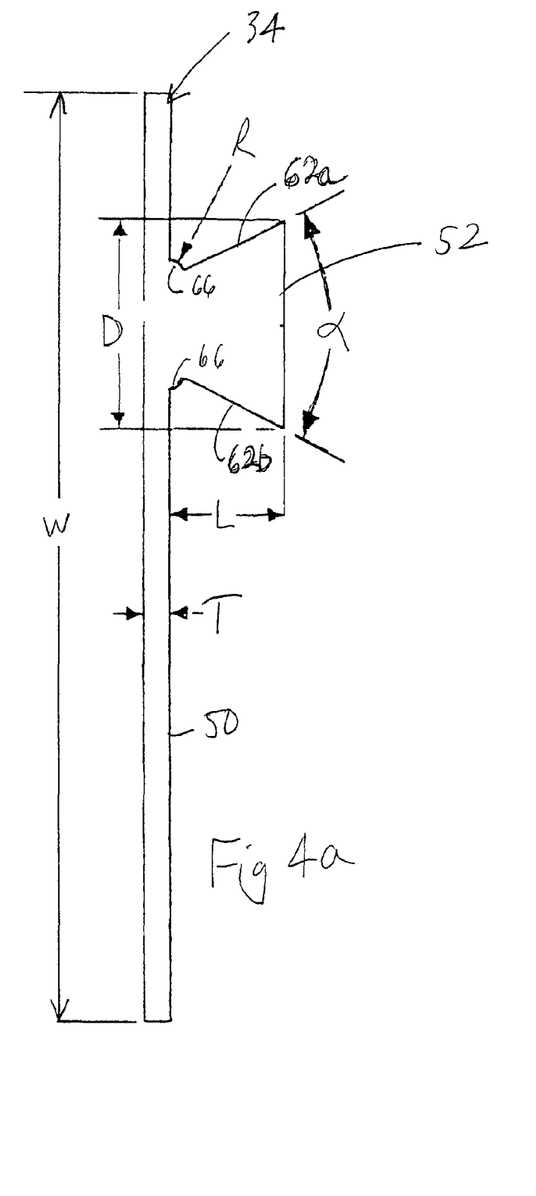
FIG. 4a is the same view as FIG. 2 of an aligning belt.
Figure 4B:
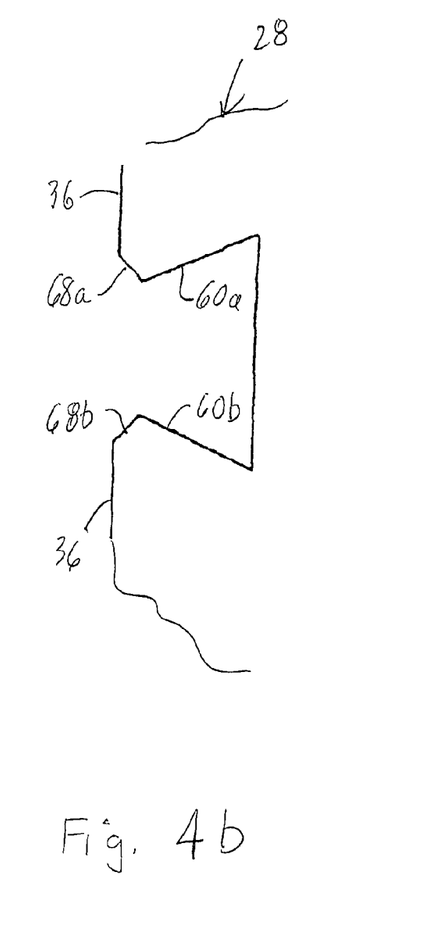
FIG. 4b is the same view as FIG. 2 of a belt support assembly.

Referring now specifically to the drawings, and the illustrative embodiments depicted therein, a conveyor system 20 includes a conveying belt 22 which may be fed items or articles, such as cartons, or the like, from two or more feed lines (not shown) and which discharges articles to a takeaway conveyor 24 for feeding in a singulated manner to a downstream process, such as a sortation system, or the like (FIG. 1). An aligner assembly 26 displaces articles, such as cartons C1 and C3 illustrated in FIG. 1, that come into contact with the aligner assembly in order to align the articles in a single file with other cartons, such as cartons C2 and C4, that do not contact the aligner assembly.

Figure 5:
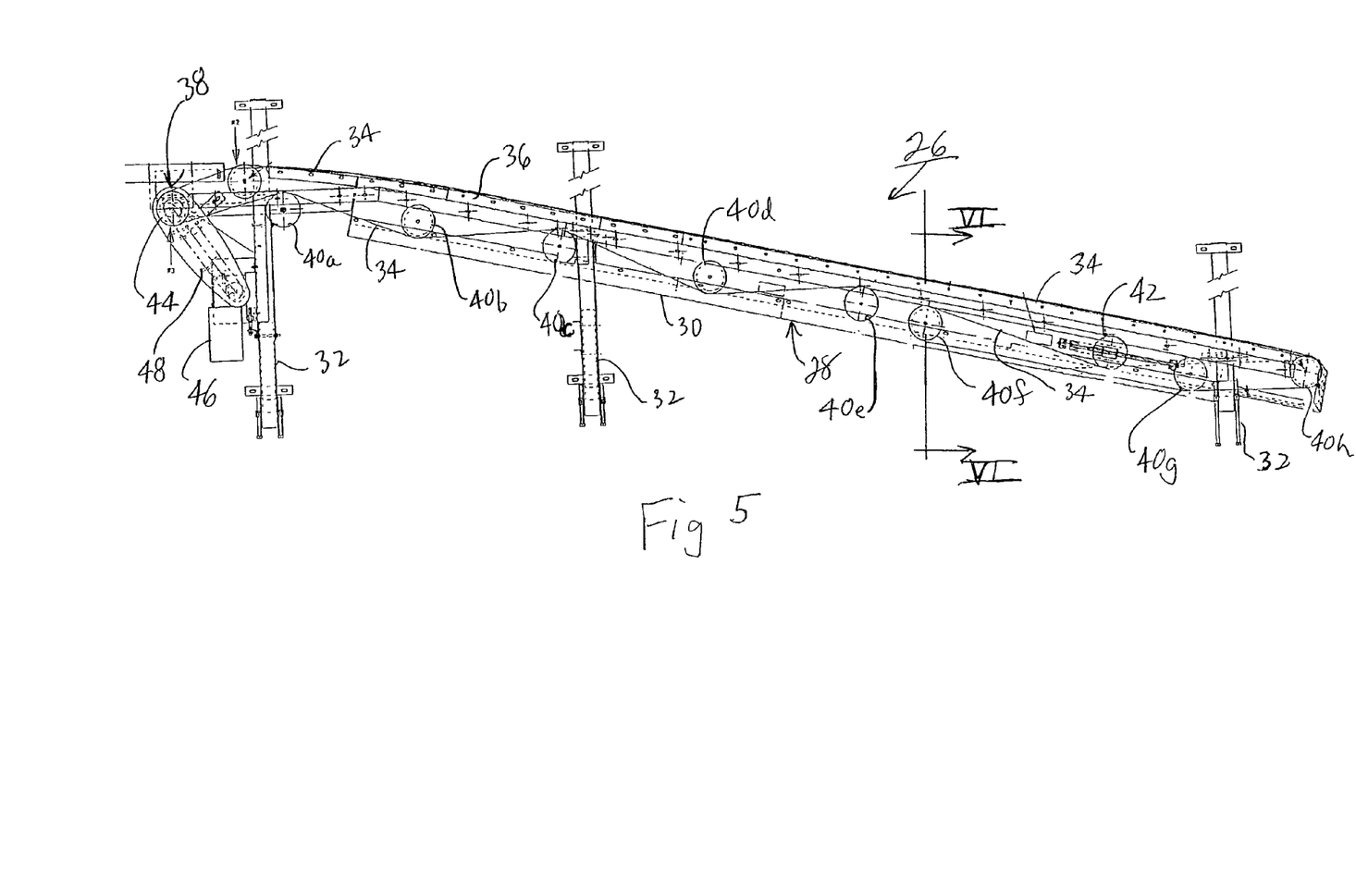
FIG. 5 is a top plan view of an aligner assembly.

Alignment assembly 26 includes a belt support assembly 28 mounted by a frame 30 supported by frame support members 32 (FIG. 5). Alignment assembly 26 additionally includes a vertically oriented continuous aligning belt 34 that engages a generally vertical support surface 36 of a belt support assembly 28. Aligning belt 34 is propelled by a belt drive 38 and reeved by a series of pulleys or sheaves 40 along the return portion of the path along the back of support surface 36. Pulleys 40a, 40b, 40c, 40d and 40e alternatingly engage opposite sides of belt 34. A belt take-up 42 maintains controlled tension on the aligning belt to accommodate belt stretch, and the like. Aligning belt 34 is reeved from roller 40e around belt take-up 42 to pulleys 40f and 40d and to an end pulley 40h. Belt drive 38 includes a drive pulley 44, driving an electric motor 46, via a transmission belt 48 for transmitting the motion of an output of motor 46 to drive pulley 44.

Aligning belt, or alignment belt, 34 has a contact portion 50 and a guide member 52 (FIGS. 2-4b). Contact portion 50 has a contact surface 54 that is configured to engage and laterally displace articles and a glide surface 56 that travels along support surface 36 of belt support assembly 28. Belt support assembly 28 defines a channel 58 that is configured to capture guide member 52 in a positive fashion so that guide member 52 is impeded from laterally pulling out of channel 58 thereby providing vertical support to aligning belt 34. However, guide member 52 is capable of low-friction longitudinal travel along channel 58 in order to allow aligning belt 34 to travel longitudinally along support surface 36. In the illustrative embodiment, glide surface 56 slides along support surface 36 by surface-to-surface contact. However, other techniques, such as guide rollers, air cushions, magnetic levitation, or the like, may provide or assist the interface between the aligning belt and the support surface.

Aligning assembly 26 in the illustrative embodiment is approximately 20 feet in length. The engagement between the guide member 52 and channel 58 supports alignment belt 34 against the weight of gravity notwithstanding the length of the aligner assembly. It should be understood, however, that the aligner assembly may be used in applications requiring a greater or lesser length than the aligner assembly disclosed in the illustrative embodiment.

In the illustrative embodiment, alignment belt 34 is made from a contact portion 50 and a guide member 52 that are separately manufactured and fused together after the individual components are manufactured. However, the skilled artisan would comprehend that the two components of alignment belt 34 may be commonly formed, such as by an extrusion process, or like. In the illustrative embodiment, both the contact portion and guide member 52 are made from a urethane polymer, such as a food-grade non-stick urethane. However, it is possible that other polymers may be used. Advantageously, glide surface 56 provides a urethane interface with support surface 36. Not only does this reduce friction between the surfaces, but the urethane has sufficient durability to avoid significant abrasion, notwithstanding the point-loading experienced by edges of cartons impacting the alignment belt during the carton-aligning process. In the illustrative embodiment, belt support assembly 28 is made in whole or in part from a lubricated UMHW material of the type that is known in the art and marketed under the Nolus brand.

Channel 58 is defined by an interior surface 60 made up of surface portions 60a and 60b that are complimentary with, and slidably engage, surface portions 62a and 62b of guide member 52. Surface portions 62a, 62b diverge away from each other and are thereby more separate from each other further away from glide surface 56. In this manner, guide member 52 has a cross section that increases in width away from the glide surface. Portions 60a and 60b of interior surface 60 also diverge away from each other further from support surface 36. In this manner, channel 58 captures or traps guide member 52 to support alignment belt 34 while allowing traveling movement at relatively low friction between guide member 52 and channel 58 due to the low-friction interface between respective surface portions 60a, 60b and 62a, 62b. While illustrated as a trapezoid in cross section and having planar sides, it should be understood that guide member 52 and channel 58 may have other cross-sectional shapes that are non-planar, such as a semi-circular shape that increases in diameter further away from glide surface 56. Other shapes will be apparent to the skilled artisan.

A series of vertical grooves 64, which are illustrated as triangular-shaped grooves, may be formed in guide member 52. This allows the guide member and, hence, alignment belt 34 to have sufficient flexibility to wrap around a pulley or sheave in a manner which will be described in more detail below. While illustrated as triangular grooves, other shapes may be apparent to the skilled artisan.

Aligning belt 34 may be separable, such as by conventional lacing, or the like, in order to assist the mounting of aligning belt 34 to belt support assembly 28. In particular, with the lacing opened up, an end of guide member 52 may be inserted into and moved along channel 58. Once the aligning belt is fully positioned on belt support assembly 28, the aligning belt may be reeved around drive pulley 44, guide pulleys 40a-40h and belt take-up 42. The lacing may then be reconnected in order to form a continuous alignment belt 34. It should be apparent to the skilled artisan that the aligner assembly can thereby be readily disassembled in order to replace the alignment belt with a replacement alignment belt, should it be necessary. This minimizes downtime of conveyor system 20 in order to enhance its usefulness. Of course, other techniques may be used to replace alignment belt 34, such as by compressing guide member 52 to laterally insert the guide member in channel 58, or the like.

In the illustrative embodiment, alignment belt 34 has a top-to-bottom dimension W of approximately three inches and a length of approximately 48 feet. In the illustrative embodiment, the thickness T contact portion 50 is nominally 0.118 inches and the length L of guide member 52 is 0.37 inches. Surface portions 62a, 62b of guide member 52 diverge from each other in the illustrative embodiment at a nominal angle α of 50 degrees. A weld line 66 that fuses guide member 52 to contact portion 50 in the illustrative embodiment has a nominal radius R of 0.070 inches. In the illustrated embodiment, at its greatest extent, guide member 52 has a depth D of 0.692 inches. It should be understood that the dimensions are for illustration purposes only and are not intended to be limiting. Belt support assembly 28 may include a pair of offset surface portions 68a, 68b which provide an interface between support surface 36 and respective interior surface portions 60a, 60b and accommodate weld line 66. Edges between surface portions 68a, 68b and respective support surface 36 and interior surface portions 60a, 60b may be deburred in order to remove any sharp edges or material left over from the manufacturing process.

Figure 6:
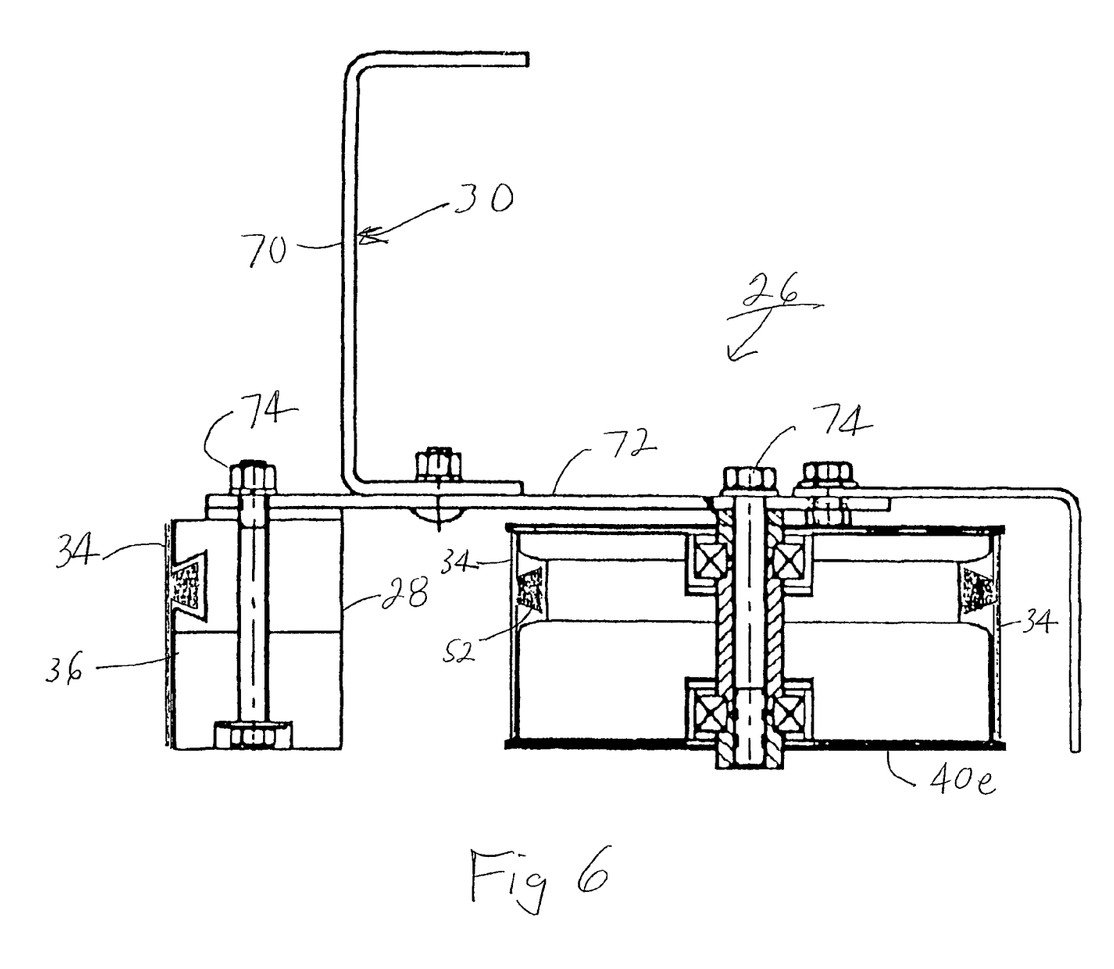
FIG. 6 is a sectional view taken along the lines VI-VI in FIG. 5.

Frame 30 may be made up of a C channel 70 and support platform 72 with belt support assembly 28 and pulleys 40a-40h interconnected with support platform 72 by fasteners 74 (FIG. 6).

Figure 7:
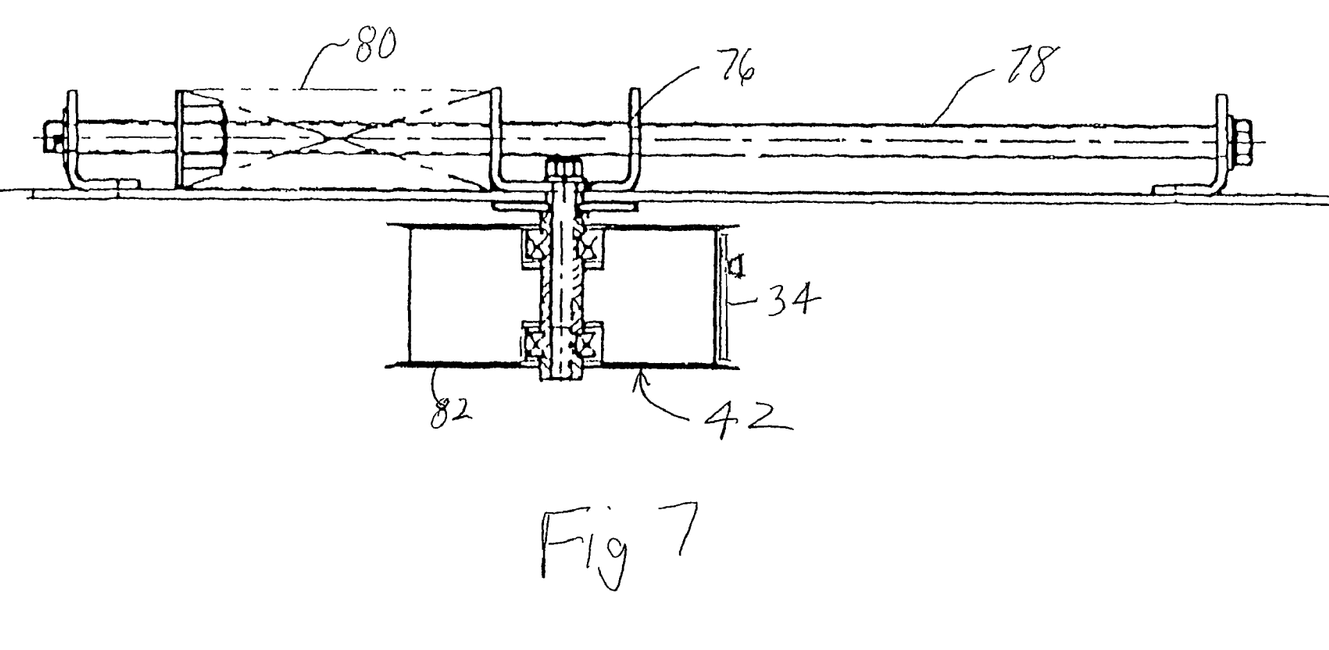
FIG. 7 is a side elevation of a belt take-up.

Belt take-up assembly 42 may include a carriage 76 that slides along a rod 78 under the bias of a compression spring 80. A pulley 82 is engaged by belt 34 in a manner that compresses spring 80. As belt 34 stretches, the stored energy in spring 80 moves carriage 76 to the right, as illustrated in FIG. 7, thereby taking up any slack in the belt.

Figure 8:
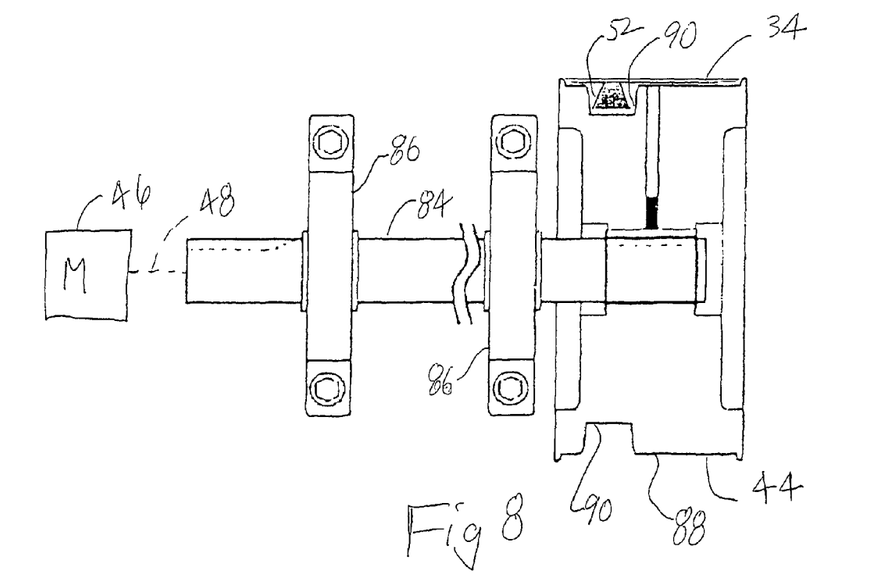
FIG. 8 is a side elevation of a belt drive.

Drive pulley 44 may be mounted to a shaft 84 which is rotatably supported by a pair of bearings 86. Drive pulley 44 includes a circumferential surface 88 that provides high-friction contact with glide surface 56 of belt 34 and an offset groove 90 to accommodate guide member 52. This allows drive pulley 44 to make contact with the portion of belt 34 normally facing belt support assembly 28, but in a manner which accommodates, without necessarily making contact with, guide member 52 (FIG. 8).

Figure 9:
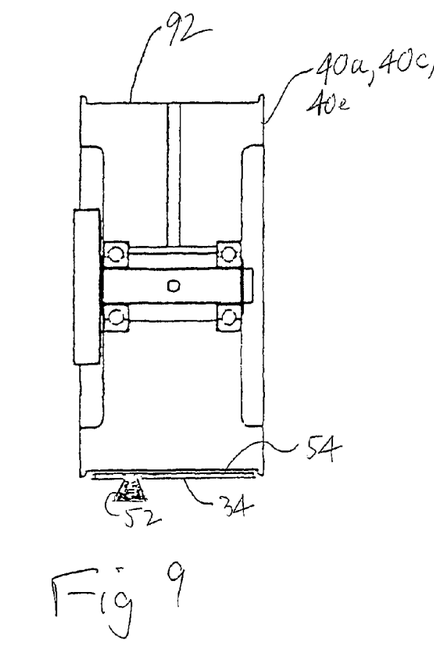
FIG. 9 is a side elevation of a belt-reeving pulley.
Figure 10:
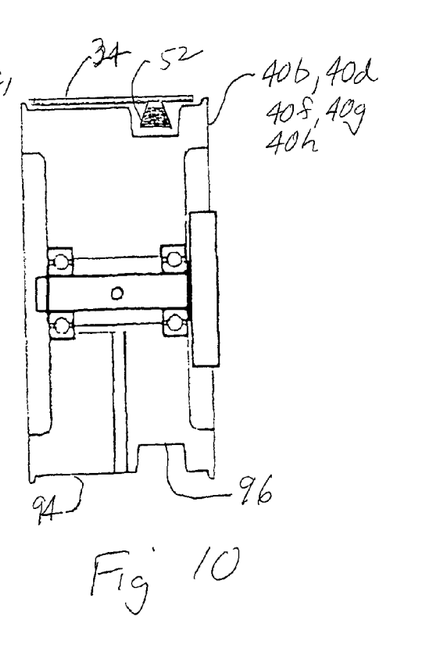
FIG. 10 is a side elevation of another configuration of a belt-reeving pulley.

Certain pulleys 40a, 40c and 40e include a circumferential surface 92 that does not include a groove in it. Guide pulleys 40a, 40c and 40e make contact with the carton contact surface 54 of belt 34 (FIG. 9). Pulleys 40b, 40d, 40f, 40g and 40h all have a circumferential surface 94 with a groove 96 defined therein in order to accommodate guide member 52 of alignment belt 34.

A mark, such as a stripe (not shown), on carton contact surface 54 of carton aligning belt 34 may be provided at even spacing, such as every two-to-three feet. This provides a visual mark that allows the technician to observe travel of the aligning belt with respect to the article-conveying belt 22. For example, the technician can observe a spot on the conveying belt, such as a stain or a piece of dirt, and compare its movement with the marks on the alignment belt and thereby determine the relative speed between the two. This allows the technician to adjust the speed of either the article-conveying belt or the alignment belt in order to bring the two manually into approximate synchronization. This further enhances ease of the maintenance process and thereby reduces the time to replace the aligning belt.

Thus, it is seen that an alignment belt having a guide member with a cross section that increases in width away from a contact portion of the belt, when interfaced with a guide member having a channel with an interior surface configuration that engages the guide member, is capable of robust design that supports the contact portion of the aligning belt notwithstanding long lengths of the aligner assembly. Moreover, the impact from the articles, such as cartons, can be absorbed by the contact portion of the aligning belt and not transferred through the guide member to the channel in the belt-supporting assembly. This distributes the impact force over a wider area enhancing the durability of the aligning belt. Also, the guide member is able to travel with relatively low friction along the channel in the belt support assembly thereby further reducing wear in the aligning belt. Moreover, the aligning assembly can be readily disassembled and the alignment belt replaced utilizing a simple procedure that does not require extensive downtime to the conveyor system.

Changes and modifications in the specifically described embodiments can be carried out without departing from the principles of the invention which is intended to be limited only by the scope of the appended claims, as interpreted according to the principles of patent law including the doctrine of equivalents.

The embodiment of the invention in which an exclusive property or Privilege is claimed are defined as follows:

1. A conveyor system aligner, comprising:
   a belt support assembly having a generally vertical support surface and a channel defined in said support surface;
   a belt drive;
   a continuous aligning belt that is driven by said belt drive, said aligning belt having a contact portion and a guide member, said contact portion having a contact surface and a glide surface, said glide surface is configured to travel along said support surface, said guide member adapted to be captured by said channel and travel in said channel to support said belt;
   wherein at least a portion of said guide member has a cross section that increases in width away from said contact portion and wherein said channel has an interior surface configuration that engages said portion of said guide member; and
   a horizontal conveyor, said horizontal conveyor adapted to convey articles past said aligning belt.

2. The aligner as claimed in claim 1 wherein said generally vertical support surface and said glide surface are generally planar.

3. The aligner as claimed in claim 1 wherein said portion of said guide member has opposite surfaces that diverge away from said glide surface.

4. The aligner as claimed in claim 3 wherein said opposite surfaces are generally planar.

5. The aligner as claimed in claim 3 wherein said opposite surfaces are non-planar.

6. The aligner as claimed claim 3 including spaced apart notches defined in said guide member.

7. The aligner as claimed in claim 1 wherein said contact portion and said guide member are separate members that are fused together.

8. The aligner as claimed in claim 1 wherein at least one of said contact portion and said guide member are made from urethane.

9. The aligner as claimed in claim 1 including a plurality of rotating pulleys supporting said belt.

10. The aligner as claimed in claim 9 wherein at least one of said pulleys has a first belt-engaging surface that is configured to interface with said contact surface and wherein at least one other of said pulleys has a second belt-engaging surface that is configured to interface with said glide surface and said guide member.

11. The aligner as claimed in claim 9 wherein said belt drive includes one of said pulleys and a motor that rotates said one of said pulleys.

12. The alignek as claimed in claim 9 including a take-up assembly, said take-up assembly including one of said pulleys.

13. The aligner as claimed in claim 1 wherein said aligning belt has a portion that is adapted to be separated to facilitate mounting of said aligning belt to said belt support assembly.

14. The aligner as claimed in claim 3 wherein said glide surface slides along said support surface and said guide member slides in said channel.

15. The aligner as claimed in claim 3 wherein said channel captures said portion of said guide member with engaging surface portions that are configured to be engaged by said opposite surfaces of said guide member.

16. The aligner as claimed in claim 1 wherein said horizontal conveyor comprises a conveying belt.

17. The aligner as claimed in claim 1 including at least one synchronizing mark on said aligning belt that is adapted to synchronize speed between said horizontal conveyor and said aligning belt.

18. The aligner as claimed in claim 1 wherein said at least a portion of said guide member has a V-shaped cross section defining outer surface portions that diverge away from said contact portion and wherein at least a portion of said channel has V-shaped surface portions that engage said outer surface portions of said guide member.

* * * * *

UNITED STATES PATENT AND TRADEMARK OFFICE
CERTIFICATE OF CORRECTION

PATENT NO.       : 7,992,701 B2                                                                 Page 1 of 1
APPLICATION NO.  : 12/211432
DATED            : August 9, 2011
INVENTOR(S)      : Stephen C. Wolf It is certified that error appears in the above-identified patent and that said Letters Patent is hereby corrected as shown below:

Column 6
Line 22, Claim 12, "alignek" should be --aligner--

Signed and Sealed this
Eleventh Day of October, 2011

David J. Kappos
*Director of the United States Patent and Trademark Office*